F. P. CRIBBINS.
MACHINE FOR HOMOGENIZING MILK, CREAM, &c.
APPLICATION FILED MAY 31, 1911.
1,030,649.
Patented June 25, 1912.
3 SHEETS—SHEET 1.
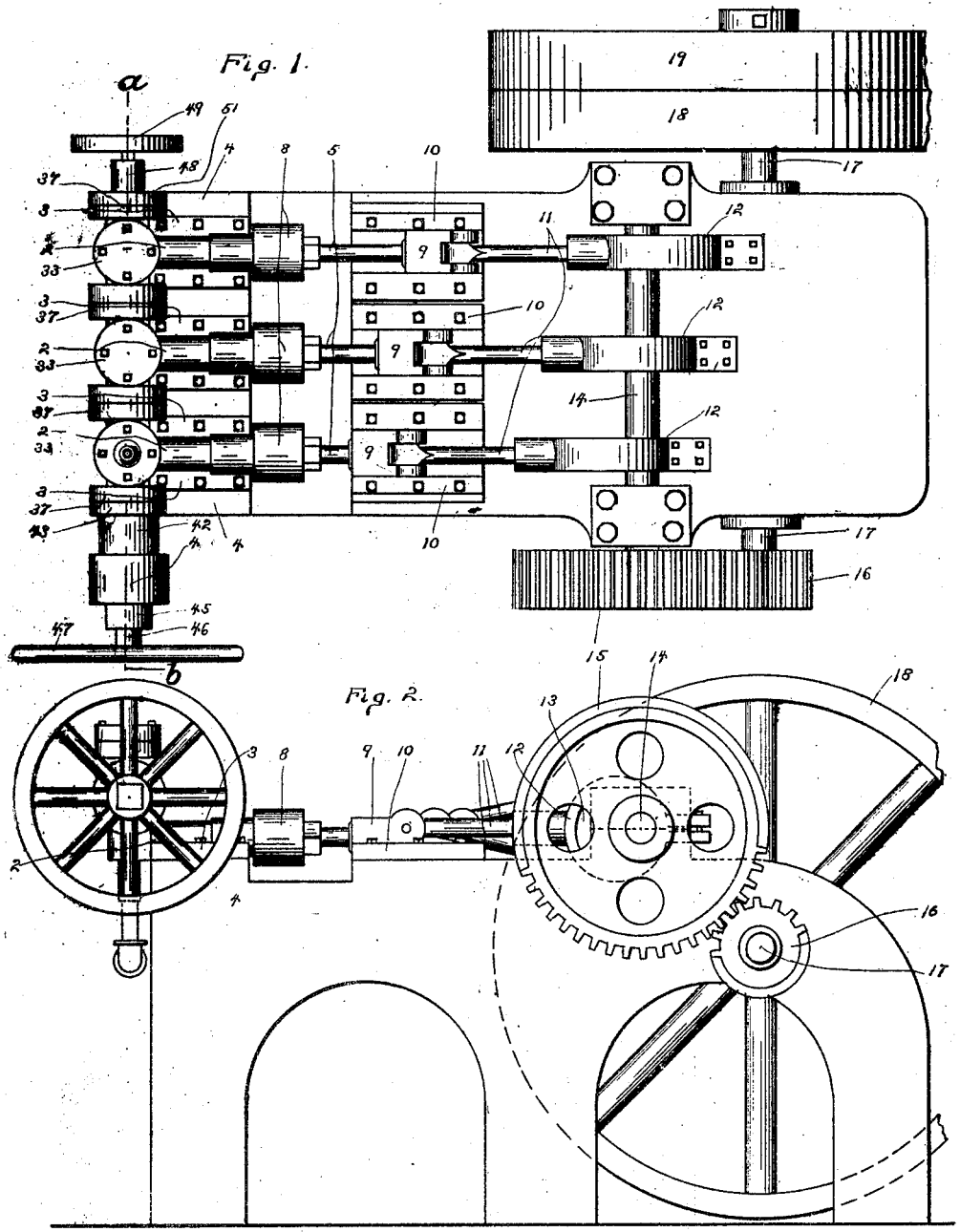

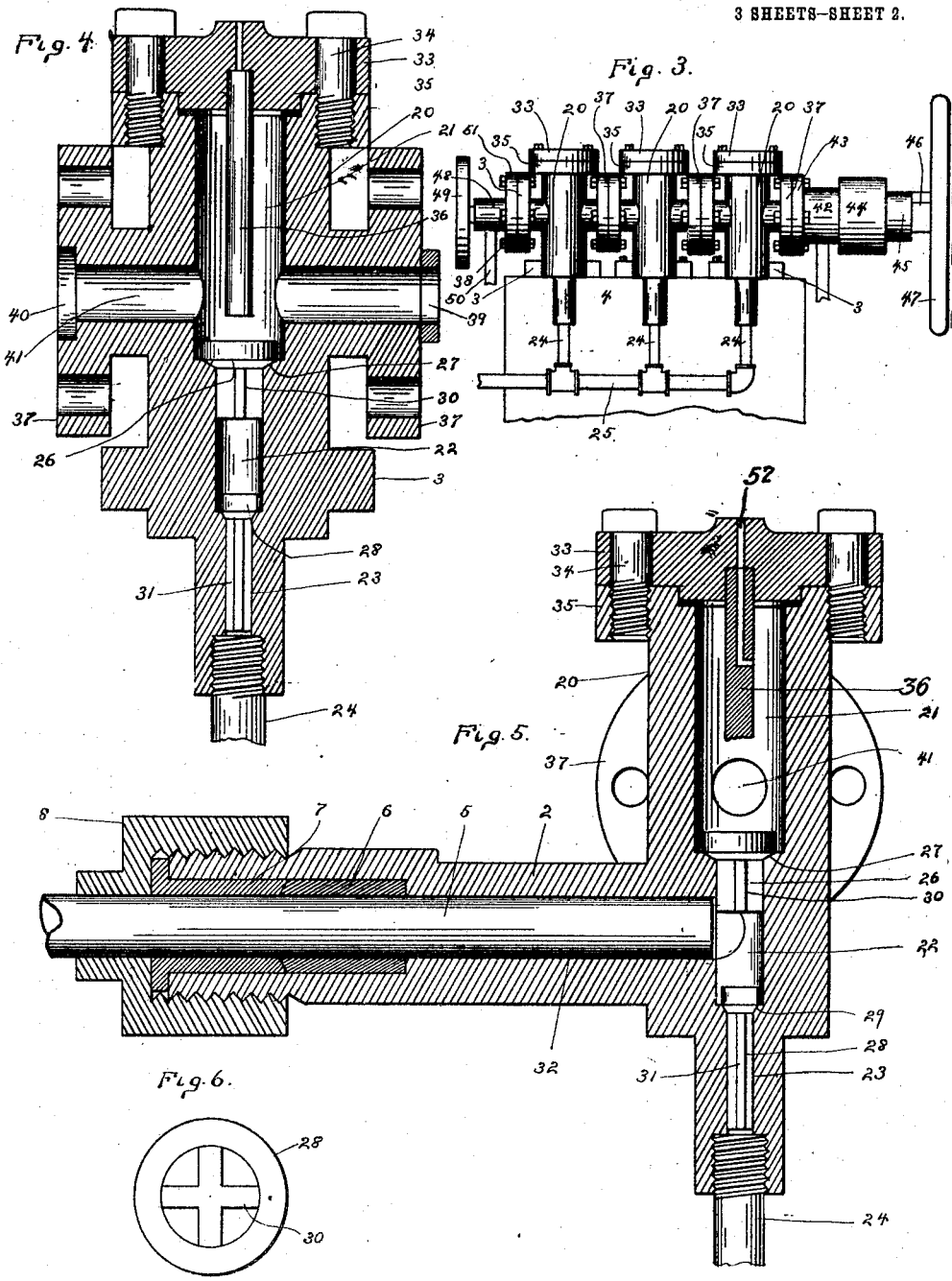

F. P. CRIBBINS.
MACHINE FOR HOMOGENIZING MILK, CREAM, &c.
APPLICATION FILED MAY 31, 1911.
1,030,649.
Patented June 25, 1912.
3 SHEETS—SHEET 3.
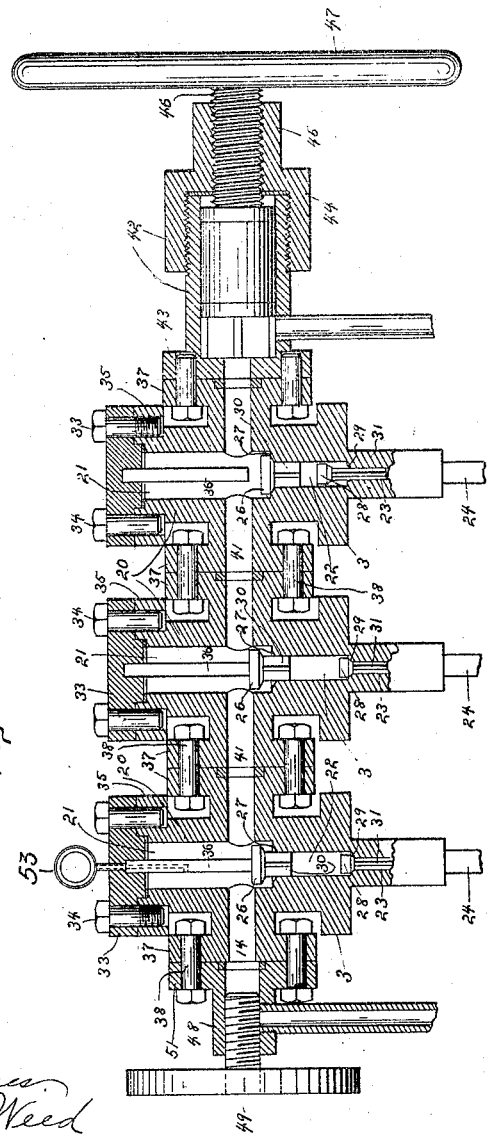

UNITED STATES PATENT OFFICE.

FRANK P. CRIBBINS, OF DERBY, CONNECTICUT.

MACHINE FOR HOMOGENIZING MILK, CREAM, &c.

1,030,649.  Specification of Letters Patent.  Patented June 25, 1912.

Application filed May 31, 1911. Serial No. 630,540.

*To all whom it may concern:*

Be it known that I, FRANK P. CRIBBINS, a citizen of the United States, residing at Derby, in the county of New Haven and State of Connecticut, have invented a new and useful Improvement in Machines for Homogenizing Milk, Cream, &c.; and I do hereby declare the following, when taken in connection with the accompanying drawings and the letters of reference marked thereon, to be a full, clear, and exact description of the same, and which said drawings constitute part of this specification, and represent, in—

Figure 1 a broken view of a machine for homogenizing milk, constructed in accordance with my invention. Fig. 2 a broken view thereof in side elevation. Fig. 3 a broken rear view of the machine, showing the three cylinders bolted together. Fig. 4 an enlarged view in vertical transverse section of one of the three cylinders. Fig. 5 a corresponding view thereof in longitudinal section. Fig. 6 a reverse plan view of one of the upper valves. Fig. 7 a broken view of the machine in vertical transverse section on the line a—b of Fig. 1.

My invention relates to an improvement in machines for homogenizing milk, the object being to simplify their construction and to make them more convenient of access for cleaning and repair.

With these ends in view, my invention consists in a machine for homogenizing milk, having certain details of construction and combinations of parts as will be hereinafter described and pointed out in the claim.

In carrying out my invention as herein shown, I employ three compression cylinders 2 corresponding to each other in form and size and bolted together side by side so as to form what I may call a gang of cylinders. Of course the number of these cylinders may be varied according to the intended capacity of the machine. The cylinders proper are arranged horizontally and formed with integral horizontal flanges 3 by means of which they are bolted to the bed 4 of the machine. Each cylinder is furnished with a piston 5 having a packing 6 held in place by a gland 7 located within a threaded stuffing box 8. At their outer ends the pistons are provided with slides 9 running in horizontal guides 10. The said slides 9 are yoke-shaped at their outer ends for the pivotal attachment to them of piston rods 11 the opposite ends of which are secured to eccentric straps 12 encircling eccentrics 13 mounted upon a shaft 14 furnished at one end with a large gear wheel 15 meshing into a pinion 16 mounted upon the main shaft 17 which is furnished at its opposite end with a driving pulley 18 and a loose pulley 19. I may here remark that the eccentrics 13 are mounted upon the shaft 14 in different positions so that they work in sequence.

At their outer ends the cylinders 2 are provided with integral vertically arranged chambered heads 20 extending above and below the cylinders and each containing an upper valve-chamber 21 opening at its lower end into a lower valve-chamber 22 smaller than the said upper valve-chamber and opening at its lower end into an inlet passage 23 smaller than the valve-chamber 22. Inlet pipes 24 screwed into the lower ends of the heads 20 discharge milk into the lower ends of the inlet passages 23, receiving it from a supply-pipe 25. In the upper valve-chamber 21 I locate an upper valve 26 for which a valve-seat 27 is provided, and in the lower valve-chamber 22 I locate a lower valve 28 for which a valve-seat 29 is provided. The stem 30 of the valve 26 extends downward into the chamber 22, while the stem 31 of the valve 28 extends downward into the inlet-passage 23. The upper valve-chamber 22 is intersected at a right angle by the piston-chamber 32 in the cylinder 2. At its upper end each head is furnished with a cap 33 secured in place by bolts 34 entering a flange 35 at the upper end of the head. Each head is furnished with an adjustable valve-stop rod 36 provided for preventing the upper valve 26 from being lifted too far by the milk when the same is being compressed.

The three cylinders 2 are provided upon the opposite faces of their heads 20 with annular assembling-flanges 37 providing for bolting the cylinders together side by side by means of bolts 38, one of the flanges 37 of each head 20 having a concentric shoulder 39, and the other a corresponding recess 40, whereby the cylinders are interlocked.

Leading in either direction out of the upper valve-chamber 21 of each head 20 is a passage 41 concentric with and connecting the said flanges 37. When the three heads 20 are bolted together, these passages 41 are exactly in line and serve to conduct the milk under pressure, to a pressure-box 42 having a flange 43 adapting it to be bolted to the adjacent flange 37 of the adjacent head 20. This pressure-box 42 is designed to contain globule-breaking devices of any approved construction, such, for instance, as those shown in my pending application filed September 19, 1910, Serial No. 582,726. The pressure-box 42 is threaded for the application of a cap 44 having a hub 45 receiving a pressure-screw 46 furnished with a hand-wheel 47 by which the action of the globule-breaking devices is regulated. At the opposite end of the passage 41 I locate a relief-valve 48 operated by a hand-wheel 49 and having a discharge pipe 50, the valve 48 being furnished with a flange 51 bolted to the adjacent flange 37 of the adjacent head 20. It is designed to open the relief valve 48 whenever air accumulates in undue quantities in the cylinders.

On account of the relative location of the eccentric 13 upon the shaft 14, the pistons 5 do not operate simultaneously, but one after the other. Therefore as the shaft 14 revolves, the pistons 5 are moved outward one after the other in their respective chambers 32 with the effect of creating suction enough therein to cause an inflow of milk from the pipe 25 through the inlet pipes 24 into the valve-chambers 22, this suction operating to lift the lower valves 28 and to close the upper valves 26. Enough milk will follow the retreating pistons 5 to fill not only the valve-chambers 23 but also the chambers 32 in the cylinders. Now as the shaft 14 revolves, the pistons 5 will be moved one after the other in the opposite direction, and subject the milk so drawn into the chambers 23 and 32 to tremendous pressure, whereby the lower valves will be firmly seated upon their seats 29, and the upper valves lifted from their seats 27 until they are stopped by the stop-rods 36. The milk thus condensed flows through the horizontal passage 41 intersecting the chambers 21, and is forced by the pressures produced within the machine to pass through the pressure-box 42 in which its globules are broken up.

What I particularly wish to point out is, that on account of the flanged construction of the heads of the cylinders, the said heads may be readily bolted together side by side so as to form, as it were, a gang, their numbers being increased or decreased according to the desired capacity of the machine. As thus constructed the cylinders are very accessible since it is only necessary to remove the bolts 38 to get at the respective cylinders for cleaning them, or for any other attention or repair.

As shown in Figs. 5 and 7, the stop-rod 36 is formed with a small passage 52 leading to a pressure-gage 53 secured to the upper face of the cap 33.

I claim:—

In a machine for homogenizing milk, the combination with a plurality of horizontally arranged cylinders each provided with an upright chambered head formed on opposite sides with alined assembling-flanges, whereby the said cylinders may be bolted directly together to form a gang of cylinders internally traversed and connected by a continuous passage leading laterally through all of the said chambered heads and assembling-flanges with which latter the said passage is concentric; of a piston for each cylinder, means for actuating the said pistons in sequence for subjecting milk introduced into the said heads to pressure, a pressure-box containing globule-breaking devices attached to the outer assembling-flange of the outer head at one end of the said gang of cylinders, and means for supplying milk to the several cylinders for condensation in them by their respective pistons by which the pressure is generated within the cylinders for forcing milk through the said globule-breaking devices.

In testimony whereof, I have signed this specification in the presence of two subscribing witnesses.

FRANK P. CRIBBINS

Witnesses:
 EDW. G. KNARR,
 DAISY W. HAUPT.

---

Copies of this patent may be obtained for five cents each, by addressing the "Commissioner of Patents Washington, D. C."